US007419741B2

(12) United States Patent
Vernstrom et al.

(10) Patent No.: US 7,419,741 B2

(45) Date of Patent: Sep. 2, 2008

(54) FUEL CELL CATHODE CATALYST

(75) Inventors: George D. Vernstrom, Inver Grove Heights, MN (US); Radoslav Atanasoski, Edina, MN (US); Mark K. Debe, Stillwater, MN (US); Gregory M. Haugen, Edina, MN (US); Krzysztof A. Lewinski, Oakdale, MN (US); Andrew J. L. Steinbach, Minneapolis, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 909 days.

(21) Appl. No.: 10/674,594

(22) Filed: Sep. 29, 2003

(65) Prior Publication Data

US 2005/0069755 A1 Mar. 31, 2005

(51) Int. Cl.
*H01M 4/00* (2006.01)

(52) U.S. Cl. ........................................ 429/44; 502/101

(58) Field of Classification Search .................. 429/44; 502/101

See application file for complete search history.

(56) References Cited

U.S. PATENT DOCUMENTS

| | | | | |
|---|---|---|---|---|
| 3,969,545 | A | 7/1976 | Slocum | |
| 4,148,294 | A | 4/1979 | Scherber et al. | |
| 4,155,781 | A | 5/1979 | Diepers | |
| 4,209,008 | A | 6/1980 | Lemkey et al. | |
| 4,252,843 | A | 2/1981 | Dorer et al. | |
| 4,252,865 | A | 2/1981 | Gilbert et al. | |
| 4,316,944 | A | 2/1982 | Landsman et al. | 429/44 |
| 4,340,276 | A | 7/1982 | Maffitt et al. | |
| 4,396,643 | A | 8/1983 | Kuehn et al. | |
| 4,568,598 | A | 2/1986 | Bilkadi et al. | |
| 4,812,352 | A | 3/1989 | Debe | |
| 4,985,386 | A | 1/1991 | Tsurumi et al. | |
| 5,039,561 | A | 8/1991 | Debe | |
| 5,079,107 | A | 1/1992 | Jalan | |
| 5,138,220 | A | 8/1992 | Kirkpatrick | |
| 5,176,786 | A | 1/1993 | Debe | |
| 5,336,558 | A | 8/1994 | Debe | |
| 5,338,430 | A | 8/1994 | Parsonage et al. | |
| 5,593,934 | A | 1/1997 | Stonehart | |
| 5,763,363 | A | 6/1998 | Schulz et al. | |
| 5,872,074 | A | 2/1999 | Schulz et al. | |
| 5,879,827 | A | 3/1999 | Debe et al. | |
| 5,879,828 | A | 3/1999 | Debe et al. | |
| 6,040,077 | A | 3/2000 | Debe et al. | |
| 6,051,046 | A | 4/2000 | Schulz et al. | |
| 6,136,412 | A | 10/2000 | Spiewak et al. | |
| 6,183,668 | B1 | 2/2001 | Debe et al. | |
| 6,277,170 | B1 | 8/2001 | Schulz et al. | |
| 6,300,000 | B1 | 10/2001 | Cavalca et al. | 429/40 |
| 6,319,293 | B1 | 11/2001 | Debe et al. | |
| 6,482,763 | B2 | 11/2002 | Haugen et al. | 502/101 |
| 2002/0146614 | A1 | 10/2002 | Norskov et al. | |

FOREIGN PATENT DOCUMENTS

| | | |
|---|---|---|
| EP | 0 671 357 A1 | 9/1995 |
| EP | 0 671 357 B1 | 9/1995 |
| EP | 0 827 225 A2 | 3/1998 |
| WO | WO 96/23906 | 8/1996 |
| WO | WO 03/073541 A1 | 9/2003 |

OTHER PUBLICATIONS

Sanjeev Mukerjee and Supramaniam Srinivasan; "Enhanced Electrocatalysis of Oxygen Reduction on Platinum Alloys in Proton Exchange Membrane Fuel Cells", *Journal of the Electroanalytical Chemistry*, Lausanne, CH, vol. 357, 1993, pp. 201-224.

U. A. Paulus, A. Wokaun, G. g. Scherer, T. J. Schmidt, V. Stamenkovic, N. M. Markovic, and P. N. Ross; "Oxygen Reduction on High Surface Area Pt-based Alloy Catalysts in Comparison to Well Defined Smooth Bulk Alloy Electrodes", *Electrochimica Acta*, Elsevier Science Publishers, Barking, GB, vol. 47, No. 22-23, Aug. 30, 2002, pp. 3787-3798.

A. K. Shukla, M. Neergat, Parthasarathi Bera, V. Jayaram, and M. S. Hegde; "An XPS Study on Binary and Ternary Alloys of Transition Metals With Platinized Carbon and Its Bearing Upon Oxygen Electroreduction in Direct Methanol Fuel Cells", *Journal of Electroanalytical Chemistry*, vol. 504, No. 1, 2001, pp. 111-119.

Takako Toda, Hiroshi Igarashi, Hiroyuki Uchida, and Masahiro Watanabe; "Enhancement of the Electroreduction of Oxygen on Pt Alloys With Fe, Ni, and Co", *Journal of the Electrochemical Society*, vol. 146, No. 10, Oct. 1999, pp. 3750-3756.

A. Lima, C. Coutanceau, J. M. Leger, and C. Lamy; "Investigation of Temary Catalysts for Methanol Electrooxidation", *Journal of Applied Electrochemistry*, Chapman and Hall. London, GB, vol. 31, 2001, pp. 379-386.

(Continued)

*Primary Examiner*—Patrick Ryan
*Assistant Examiner*—Thomas H. Parsons
(74) *Attorney, Agent, or Firm*—Philip Y. Dahl

(57) ABSTRACT

A fuel cell cathode catalyst is provided which comprises nanostructured elements comprising microstructured support whiskers bearing nanoscopic catalyst particles. The nanoscopic catalyst particles are made by the alternating application of first and second layers, the first layer comprising platinum and the second layer being an alloy or intimate mixture of iron and a second metal selected from the group consisting of Group VIb metals, Group VIIb metals and Group VIIIb metals other than platinum and iron, where the atomic ratio of iron to the second metal in the second layer is between 0 and 10, where the planar equivalent thickness ratio of the first layer to the second layer is between 0.3 and 5, and wherein the average bilayer planar equivalent thickness of the first and second layers is less than 100 Å.

25 Claims, 1 Drawing Sheet

OTHER PUBLICATIONS

Peter Strasser, Qun Fan, Martin Devenney, and W. Henry Weinberg; "High Throughput Experimental and Theoretical Predictive Screening of Materials—A Comparative Study of Search Strategies for New Fuel Cell Anode Catalysts", *Journal of Physical Chemistry B*, vol. 107, No. 40, Sep. 17, 2003, pp. 11013-11021.

N. M. Markovic, T. J. Schmidt, V. Stamenkovic, and P. N. Ross, "*Oxygen Reduction Reaction on Pt and Pt Bimetallic Surfaces: A Selective Review*", Fuel Cells 2001, vol. 1, No. 2., pp. 105-116.

U. A. Paulus, A. Wokaun, and G. G. Scherer, T. J. Schmidt, V. Stamenkovic, V. Radmilovic, N. M. Markovic, and P. N. Ross; "*Oxygen Reduction on Carbon-Supported Pt-Ni and Pt-Co Alloy Catalysts*", J. Phys. Chem. B, Apr. 25, 2002, vol. 106, No. 106, pp. 4181-4191.

J. McBreen and S. Mukerjee: "In Situ *X-RayAbsorption Studies of Carbon Supported Pt and Pt Alloy Nanoparticles*" in A. Wieckowski ed.: Interfacial Electrochemistry, M. Dekker, 1999, pp. 895-914.

M. Watanabe, H. Uchida, Y. Matsuura; "*Experimental Analysis: The Role Of The Electronic Structure Change By Pt-Alloying In The Fuel Cell Reactions*", Keynote Lecture at 4$^{th}$ International Conference on Electrocatalysis, Clean Energy Research Center, Yamanashi University, Takeda 4, Kofu 400-8510, Japan, Sep. 23-25, 2002, Como, Italy, (Abstract) K16.

G.M .Chow, W.B. Stockton, R. Price, S. Baral, A.C. Ting, B.R. Ratna, P.E. Shoen, and J.M. Schnur, G.L. Bergeron, M.A. Czarnaski, J.J. Hickman, and D. A. Kirkpatrick; "*Fabrication Of Biologically Based Microstructure Composites For Vacuum Field Emission*"; Materials Science and Engineering, A158, (1992), pp. 1-6.

K. K. Kam, M, K. Debe, R. J. Poirier, and A. R. Drube; "*Summary Abstract: Dramatic Variation Of The Physical Microstructure Of A Vapor Deposited Organic Thin Film*", J. Vac. Sci. Technol A, 5, (4), Jul./Aug. 1987, pp. 1914-1916.

J. A. Floro, S. M. Rossnagel, and R. S. Robinson; "*Ion-bombardment-induced Whisker Formation On Graphite*", J. Vac. Sci. Technol A, 1, (3), Jul./Sep. 1983, pp. 1398-1402.

M. K. Debe, K. K. Kam, J. C. Liu, R. J. Poirier, "*Vacuum Vapor Deposited Thin Films Of a Perylene Dicarboximide Derivative; Microstructure Versus Deposition Parameters*", J. Vac. Sci. Technol A, 6, (3), May/Jun. 1988, pp. 1907-1911.

M. K. Debe and R. J. Poirier; "*Effect of Gravity On Copper Phthalocyanine Thin Films III: Microstructure Comparisons Of Copper Phthalocyanine Thin Films Grown In Microgravity And Unit Gravity*", Thin Solid Films 186, 1990, pp. 327-347.

Y. Sadaoka, T. A. Jones, G. S. Revell, and W. Gopel; "*Effects Of Morphology On $NO_2$ Detection In Air At Room Temperature With Phthalocyanine Thin Films*", J. Mat. Sci. 25, 1990, pp. 5257-5268.

Rapidly Quenched Metals, Proc of the Fifth Int. Conf on Rapidly Quenched, Metals, Wurzburg, Germany, Sep. 3-7, 1984, S. Steeb et al., eds., Elsevier Science Publishers B.V., New York, 1985, pp. 1117-1124.

P. K. Lee and M. K. Debe; "*Measurement and Modeling of the Reflectance-Reducing Properties of Gradient Index Microstructured Surfaces*", Photographic Science and Engineering, vol. 24, (4), Jul./Aug. 1980, pp. 211-216.

K. Robbie, L. J. Friedrich, S. K. Dew, J. Smy and M. J. Brett; *Fabrication Of Thin Films With Highly Porous Microstructures*, J. Vac. Sci. Technol. A 13(3), May/Jun. 1995, pp. 1032-1035.

K. Robbie, M. J. Brett and A. Lakhtokia; *First Thin Film Realization Of A Helicoidal Bianisotropic Medium*, J. Vac. Sci. Technol. A 13(6), Nov./Dec. 1995, pp. 2991-2993.

FUEL CELL CATHODE CATALYST

This invention was made with Government support under Cooperative Agreement DE-FC02-99EE50582 awarded by DOE. The Government has certain rights in this invention.

FIELD OF THE INVENTION

This invention relates to catalysts comprising nanostructures formed by depositing alternating layers of platinum and a second layer onto a microstructure support. The catalysts are useful as fuel cell cathode catalysts.

BACKGROUND OF THE INVENTION

U.S. Pat. No. 5,879,827, the disclosure of which is incorporated herein by reference, discloses nanostructured elements comprising acicular microstructured support whiskers bearing acicular nanoscopic catalyst particles. The catalyst particles may comprise alternating layers of different catalyst materials which may differ in composition, in degree of alloying or in degree of crystallinity.

U.S. Pat. App. Pub. No. 2002/0004453 A1, (now U.S. Pat. No. 6,482,763), the disclosure of which is incorporated herein by reference, discloses fuel cell electrode catalysts comprising alternating platinum-containing layers and layers containing suboxides of a second metal that display an early onset of CO oxidation.

U.S. Pat. Nos. 5,338,430, 5,879,828, 6,040,077 and 6,319,293, the disclosures of which are incorporated herein by reference, also concern nanostructured catalysts.

U.S. Pat. Nos. 4,812,352, 5,039,561, 5,176,786, and 5,336,558, the disclosures of which are incorporated herein by reference, concern microstructures.

U.S. Pat. No. 5,079,107 discloses a catalyst for a phosphoric acid electrolyte fuel cell comprising a ternary alloy of Pt—Ni—Co, Pt—Cr—C or Pt—Cr—Ce.

U.S. Pat. No. 4,985,386 discloses a catalyst on a carbon support, the catalyst comprising carbides of Pt, carbides of a second metal selected from Ni, Co, Cr and Fe, and optionally carbides of Mn. The reference also discloses a method of making a carbon supported catalyst by reductive deposition of metal ions onto carbon supports followed by alloying and at least partial carburizing of the metals by application of heat and carbon-containing gasses.

U.S. Pat. No. 5,593,934 discloses a catalyst on a carbon support, the catalyst comprising 40-90 atomic % Pt, 30-5 atomic % Mn and 30-5 atomic % Fe. The reference includes comparative examples purportedly demonstrating carbon-supported catalysts comprising 50 atomic % Pt, 25 atomic % Ni and 25 atomic % Co; 50 atomic % Pt and 50 atomic % Mn; and Pt alone.

U.S. Pat. No. 5,872,074 discloses a catalyst made by first preparing a metastable composite or alloy which comprises crystallites having a grain size of 100 nm or lower and then leaching away one of the elements of that alloy.

Markovic et al., *Oxygen Reduction Reaction on Pt and Pt Bimetallic Surfaces: A Selective Review, Fuel Cells,* 2001, Vol. 1, No. 2 (pp. 105-116) examines reactions at crystal surfaces of bimetallic Pt—Ni and Pt—Co catalysts made by underpotential deposition method, the classical metallurgical method and deposition of pseudomorphic metal films.

Paulus et al., *Oxygen Reduction on Carbon-Supported Pt—Ni and Pt—Co Alloy Catalysts, J. Phys. Chem. B,* 2002, No. 106 (pp. 4181-4191) examines commercially available carbon-supported catalysts comprising Pt—Ni and Pt—Co alloys.

SUMMARY OF THE INVENTION

Briefly, the present invention provides a cathode catalyst which comprises nanostructured elements comprising microstructured support whiskers bearing nanoscopic catalyst particles. The nanoscopic catalyst particles are made by the alternating application of first and second layers, the first layer comprising platinum and the second layer being an alloy or intimate mixture of iron and a second metal selected from the group consisting of Group VIb metals, Group VIIb metals and Group VIIIb metals other than platinum and iron, where the atomic ratio of iron to the second metal in the second layer is between 0 and 10, where the planar equivalent thickness ratio of the first layer to the second layer is between 0.3 and 5, and wherein the average bilayer planar equivalent thickness of the first and second layers is less than 100 Å. Typically, the planar equivalent thickness ratio of the first layer to the second layer is between 0.3 and 2.5, and the average bilayer planar equivalent thickness is greater than 8 Å. Typically the atomic ratio of iron to the second metal in the second layer is between 0.01 and 10. Typically the second metal is selected from the group consisting of nickel, cobalt and manganese, and most typically nickel or cobalt.

In another aspect, the present invention provides a method of making nanoscopic catalyst particles comprising the alternate steps of vacuum deposition of a layer comprising platinum and vacuum deposition of an alloy or intimate mixture of iron and a second metal selected from the group consisting of Group VIb metals, Group VIIb metals and Group VIIIb metals other than platinum and iron, where the atomic ratio of iron to the second metal in the second layer is between 0 and 10, wherein the deposited platinum and deposited alloy or intimate mixture of two metals form a bilayer having an average planar equivalent thickness of less than 100 Å, wherein the planar equivalent thickness ratio of deposited platinum to the deposited alloy or intimate mixture of two metals is between 0.3 and 5. Typically the vacuum deposition steps are carried out in the absence of oxygen or substantially in the absence of oxygen. Typically the atomic ratio of iron to the second metal in the second layer is between 0.01 and 10. Typically the second metal is selected from the group consisting of nickel, cobalt and manganese, and most typically nickel. In one embodiment, the method may additionally comprise the step of removing or "leaching" at least a portion of said alloy or intimate mixture of two metals after said deposition steps. The present invention additionally provides nanoscopic catalyst particles resulting from said leaching process.

What has not been described in the art, and is provided by the present invention, is a catalyst as described herein demonstrating improved properties in use as a fuel cell cathode catalyst.

In this application:

"membrane electrode assembly" means a structure comprising a membrane that includes an electrolyte, typically a polymer electrolyte, and at least one but more typically two or more electrodes adjoining the membrane;

"nanostructured element" means an acicular, discrete, microscopic structure comprising a catalytic material on at least a portion of its surface;

"nanoscopic catalyst particle" means a particle of catalyst material having at least one dimension equal to or smaller than about 15 nm or having a crystallite size of about 15 nm or less, as measured from diffraction peak half widths of standard 2-theta x-ray diffraction scans;

"acicular" means having a ratio of length to average cross-sectional width of greater than or equal to 3;

"discrete" refers to distinct elements, having a separate identity, but does not preclude elements from being in contact with one another;

"microscopic" means having at least one dimension equal to or smaller than about a micrometer;

"planar equivalent thickness" means, in regard to a layer distributed on a surface, which may be distributed unevenly, and which surface may be an uneven surface (such as a layer of snow distributed across a landscape, or a layer of atoms distributed in a process of vacuum deposition), a thickness calculated on the assumption that the total mass of the layer was spread evenly over a plane covering the same projected area as the surface (noting that the projected area covered by the surface is less than or equal to the total surface area of the surface, once uneven features and convolutions are ignored);

"bilayer planar equivalent thickness" means the total planar equivalent thickness of a first layer (as described herein) and the next occurring second layer (as described herein); and the symbol "Å" represents Angstroms, notwithstanding any typographical or computer error.

It is an advantage of the present invention to provide cathode catalysts for use in fuel cells.

DETAILED DESCRIPTION

Figure 1:
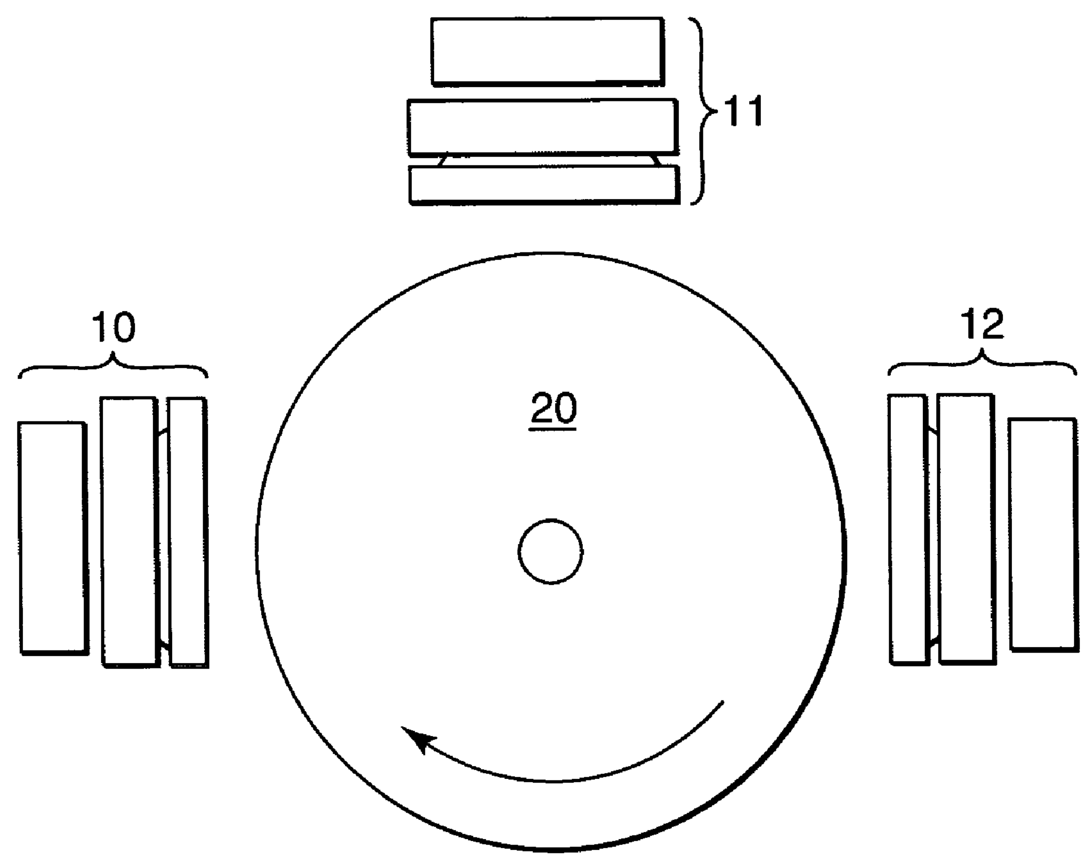
FIG. 1 is a schematic depiction of an apparatus for practice of the method of the present invention.

The present invention concerns catalysts which demonstrate unexpected improvements in activity when used as fuel cell cathode catalysts.

The fuel cell cathode catalyst according to the present invention may be used in the fabrication of membrane electrode assemblies (MEA's) for use in fuel cells. An MEA is the central element of a proton exchange membrane fuel cell, such as a hydrogen fuel cell. Fuel cells are electrochemical cells which produce usable electricity by the catalyzed combination of a fuel such as hydrogen and an oxidant such as oxygen. Typical MEA's comprise a polymer electrolyte membrane (PEM) (also known as an ion conductive membrane (ICM)), which functions as a solid electrolyte. One face of the PEM is in contact with an anode electrode layer and the opposite face is in contact with a cathode electrode layer. In typical use, protons are formed at the anode via hydrogen oxidation and transported across the PEM to the cathode to react with oxygen, causing electrical current to flow in an external circuit connecting the electrodes. Each electrode layer includes electrochemical catalysts, typically including platinum metal. Gas diffusion layers (GDL's) facilitate gas transport to and from the anode and cathode electrode materials and conduct electrical current. The GDL is both porous and electrically conductive, and is typically composed of carbon fibers. The GDL may also be called a fluid transport layer (FTL) or a diffuser/current collector (DCC). In some embodiments, the anode and cathode electrode layers are applied to GDL's and the resulting catalyst-coated GDL's sandwiched with a PEM to form a five-layer MEA. The five layers of a five-layer MEA are, in order: anode GDL, anode electrode layer, PEM, cathode electrode layer, and cathode GDL. In other embodiments, the anode and cathode electrode layers are applied to either side of the PEM, and the resulting catalyst-coated membrane (CCM) is sandwiched between two GDL's to form a five-layer MEA.

The present invention provides a fuel cell membrane electrode assembly (MEA) comprising a cathode catalyst which comprises nanostructured elements comprising microstructured support whiskers bearing nanoscopic catalyst particles. U.S. Pat. Nos. 4,812,352, 5,039,561, 5,176,786, and 5,336,558, the disclosures of which are incorporated herein by reference, concern microstructures which may be used in the practice of the present invention. U.S. Pat. Nos. 5,338,430, 5,879,827, 6,040,077 and 6,319,293 and U.S. Pat. App. Pub. No. 2002/0004453 A1, the disclosures of which are incorporated herein by reference, describe nanostructured elements comprising microstructured support whiskers bearing nanoscopic catalyst particles. U.S. Pat. No. 5,879,827 and U.S. Pat. App. Pub. No. 2002/0004453 A1, the disclosures of which are incorporated herein by reference, describe nanoscopic catalyst particles comprising alternating layers.

The nanoscopic catalyst particles according to the present invention are made by the alternating application of first and second layers, the first layer comprising or consisting essentially of platinum and the second layer being an alloy or intimate mixture of iron and a second metal selected from the group consisting of Group VIb metals, Group VIIb metals and Group VIIIb metals other than platinum and iron. Typically the second metal is selected from the group consisting of nickel, cobalt and manganese, most typically being nickel or cobalt. The atomic ratio of iron to the second metal in the second layer is between 0 and 10, typically at least 0.01, typically less than 1, more typically less than 0.4, and more typically less than 0.15. The weight ratio of the first layer to the second layer is between 0.3 and 5, typically less than 2.5. The average bilayer planar equivalent thickness of the first and second layers is less than 100 Å. The average bilayer planar equivalent thickness is typically greater than 3 Å and more typically greater than 8 Å. It is contemplated that alternating application of first and second layers does not exclude the application of layers in addition to the first and second layers.

The layered fuel cell cathode catalyst according to the present invention may be made by any suitable method. Typically, the layered catalyst according to the present invention is made by alternate steps of vacuum deposition of a layer comprising or consisting essentially of platinum and a second layer on a film of microstructures. Typically the vacuum deposition steps are carried out in the absence of oxygen or substantially in the absence of oxygen. Typically, sputter deposition is used. Typical microstructures are described in U.S. Pat. Nos. 4,812,352, 5,039,561, 5,176,786, 5,336,558, 5,338,430, 5,879,827, 6,040,077 and 6,319,293, and U.S. Pat. App. Pub. No. 2002/0004453 A1, the disclosures of which are incorporated herein by reference. Typical microstructures are made by thermal sublimation and vacuum annealing of the organic pigment C.I. Pigment Red 149, i.e., N,N'-di(3,5-xylyl)perylene-3,4:9,10-bis(dicarboximide).

Vacuum deposition may be carried out in any suitable apparatus, such as described in U.S. Pat. Nos. 5,338,430, 5,879,827, 5,879,828, 6,040,077 and 6,319,293 and U.S. Pat. App. Pub. No. 2002/0004453 A1, the disclosures of which are incorporated herein by reference. One such apparatus is depicted schematically in FIG. 1, wherein the substrate is mounted on a drum (20) which is then rotated under multiple DC magnetron sputtering sources (10, 11, 12) in sequence. The resulting structure may be layered, or substantially layered, or may include more complex intermixed structures, depending on the thickness of the material deposited and the surface area of the substrate on which the material is deposited.

In one embodiment, the method may additionally comprise the step of removing at least a portion of said alloy or intimate mixture of two metals after said deposition steps. The iron and/or the second metal may be removed by any suitable means, including leaching with aqueous solvents which may additionally contain an acid. It will be understood that some amount of iron and/or second metal may leach from the catalyst under the conditions of ordinary fuel cell operation.

The catalysts of the present invention can be used to manufacture membrane electrode assemblies (MEA's) incorporated in fuel cells such as are described in U.S. Pat. Nos. 5,879,827 and 5,879,828, the teachings of which are incorporated herein by reference.

This invention is useful in the manufacture and operation of fuel cells.

Objects and advantages of this invention are further illustrated by the following examples, but the particular materials and amounts thereof recited in these examples, as well as other conditions and details, should not be construed to unduly limit this invention.

EXAMPLES

Unless otherwise noted, all reagents were obtained or are available from Aldrich Chemical Co., Milwaukee, Wis., or may be synthesized by known methods.

PR149 Microstructures

Nanostructured Support Films employed as catalyst supports were made according to the process described in U.S. Pat. Nos. 5,338,430, 4,812,352 and 5,039,561, incorporated herein by reference, using as substrates the microstructured catalyst transfer substrates (or MCTS) described in U.S. Pat. No. 6,136,412, also incorporated herein by reference. Nanostructured perylene red (PR149, American Hoechst Corp., Somerset, N.J.) films on microstructured substrates were made by thermal sublimation and vacuum annealing of the organic pigment C.I. Pigment Red 149, i.e., N,N'-di(3,5-xylyl)perylene-3,4:9,10-bis(dicarboximide). After deposition and annealing, highly oriented crystal structures were formed with large aspect ratios, controllable lengths of about 0.5 to 2 micrometers, widths of about 0.03-0.05 micrometer and areal number density of approximately 30 whiskers per square micrometer, oriented substantially normal to the underlying substrate.

Nanostructured Catalysts

Catalysts were prepared according to the methods disclosed in U.S. Pat. Nos. 5,879,827 and 6,040,077, the disclosures of which are herein incorporated by reference. Catalyst material was deposited on PR 149 microstructures by sputter deposition using a vacuum system schematically depicted in FIG. 1, wherein the substrate mounted on a drum (20) rotates under multiple DC magnetron sputtering sources (10, 11, 12) in sequence resulting in the fabrication of a substantially layered structure. Catalyst material was deposited alternately from two targets, a Pt target and a second target composed of a single metal or a two-metal alloy, selected from: Ni, Co, Mn, $Ni_{80}Fe_{20}$, $Ni_{90}Fe_{10}$,$Ni_{95}Fe_5$, $Co_{80}Fe_{20}$, and $Mn_{80}Fe_{20}$ (subscripts refer to atomic ratios). In all cases, alternating deposition of materials was followed by a finishing deposition of Pt having a planar equivalent thickness of 1.5 nm.

The apparatus used was that described in patent U.S. Pat. No. 6,040,077 "Catalyst for Membrane Electrode Assembly and Method of Making", except in the case of PtNiFe catalysts, which were made using a similar system described following. This deposition system was equipped with a 24 inch (61 cm) drum and web control system. The main chamber was equipped with 3 cryopumps (two 6 inch (15 cm) pumps and one 16 inch (41 cm) pump, from CTI Cryogenics) capable of reducing pressure to below $7\times10^{-5}$ Pa after an overnight pump-down. Such low pressures aid in production of catalytic materials having low oxide content. The main chamber was fitted with three small 2×10 inch (5×25 cm) planar DC magnetrons (from Sierra Applied Sciences) each capable of producing a uniform deposition region over a 6 inch (15 cm) wide web. The magnetrons are equipped with stainless steel side shields so that the source materials would not intermix during catalyst deposition. The shields are frequently cleaned to lower the possibility of target contamination caused by flecks of material falling on the target during operation. The magnetrons were operated in 0.7 Pa argon introduced at a flow rate of 120 sccm. The magnetrons were powered by MDX-10K AE power supplies.

The ratio of Pt planar equivalent thickness to second-layer planar equivalent thickness was calculated on the basis of known material densities and the measured Pt and second-target calibration curves. Measurement of catalyst loading was done by a simple gravimetric method, using exemplary samples. These samples were deposited on planar substrates coated with nanostructured supports as described above. After deposition, a sample of the planar polyimide-supported nanostructured film layer was weighed using a digital balance accurate to about one microgram. Then the nanostructured layer was removed from the polyimide substrate by wiping with a linen cloth and the substrate was re-weighed. The mass per unit area of the nanostructured perylene red films without deposited metal was also measured this way. The total Pt loading in all examples, including comparatives, was held constant at 0.1 mg/cm$^2$, regardless of the amount of any other component.

Catalyst Characterization

Some catalysts were fabricated into membrane electrode assemblies (MEA's) for testing in a fuel cell, generally according to methods described in U.S. Pat. Nos. 6,136,412, 5,879,827 and 6,040,077. The MEA's were made from the above nanostructured catalysts, a cast NAFION (DuPont Chemicals, Wilmington, Del.) ion conducting membrane (ICM) having a thickness of about 30 microns and an equivalent weight of about 1000, as described in U.S. Patent Pub. No. 2001/0,031,388, incorporated herein by reference, and a carbon cloth electrode backing material coated with a carbon dispersion coating as described in U.S. Pat. No. 6,465,041, incorporated herein by reference. The catalysts according to the present invention were used as cathode catalysts. Pt-only nanostructured catalysts were used as anode catalysts.

Each 50 cm$^2$ MEA was made using a lamination procedure consisting of transfer of the catalyst-coated nanostructure elements onto the membrane by assembling a sandwich consisting of a high gloss paper, a 2 mil (50 micron) polyimide sheet, anode catalyst, cast NAFION membrane, cathode catalyst, 2 mil (50 micron) polyimide and a final sheet of high gloss paper. This assembly was then fed through a hot two roll laminator at 132° C. (270° F.) at a roll speed of 1 foot/minute and adequate nip pressure to result in transfer of the catalyst to the membrane. The glossy paper and polyimide were then peeled away to leave the 3 layer 50 cm$^2$ CCM.

The CCM's for the PtNi, PtCo, PtMn and $PtNi_{80}Fe_{20}$ samples were sandwiched between GDL layers made from carbon impregnated Toray™ Carbon Paper cut to match the CCM size of 50 cm$^2$. The rest of the samples were made with cloth DCC's, as described on page 3 lines 13-15 of U.S. Pat. No. 6,465,041.

Five-layer MEA's prepared as described above were mounted in 50 cm$^2$ fuel cell test cells (Fuel Cell Technologies, Inc., Albuquerque, N. Mex.) with Teflon coated fiberglass (The Furon Co., CHR Division, New Haven Conn.) gaskets around the perimeter to act as compression control stops. The gasket thickness were chosen to give approximately 30% compression of the MEA thickness when the cell bolts were torqued to approximately 110 in-lbs.

Oxygen Metric

The test cells with 50 $cm^2$ active areas were mounted in test stations purchased from Fuel Cell Technologies, Inc. The cell temperatures, gas (hydrogen and air or oxygen) pressures, gas flow rates and gas humidifications (relative humidity or dew points) were all controlled by the test station. The MEA's were typically conditioned by operating at a cell temperature of 65° C. and humidified gas streams having 70° C. dew points, for a number of hours. The cells were then further conditioned by repetitive potentiodynamic polarization of the cells and thermal cycling until the MEA performance was optimized and stabilized.

The oxygen metric, or $O_2$ metric, was developed to screen catalyst formulations in 50 $cm^2$ cells in an area of the polarization curve that most pertains to the catalytic region with minimal mass transport effects. The oxygen metric was measured by manually scanning in galvanostatic mode with measurements taken rapidly in order to reduce the duration of any high voltages. Gas flows were set at 1200 sccm for $H_2$ and 600 sccm for $O_2$ with a pressure of 30 psig, approximately 303 kPa, on both sides. The temperature was set at 75° C. and gases humidified at 100% of water saturation on each side. A polarization curve plotting voltage as a function of current density is generated and the data is corrected for membrane resistance and for electrical shorts and plotted as voltage vs. the log of the current density. The current density at 0.85 volts is then extracted as a measure of the activity of that particular cathode catalyst.

For the PtNi catalysts, air metric rather than oxygen metric measurements were made, under $H_2$/air operation, at ambient pressure, 75° C., with 70 percent relative humidity. The current density at 0.7 volts was taken as the measure of the cathode activity.

Results are reported in the Tables following. Example numbers followed by "C" are comparative.

TABLE 1

Pt/$Ni_{80}Fe_{20}$
$O_2$ metric current density (mA/$cm^2$) at 0.85 volts, and Example number (in parentheses) for given as-deposited bilayer equivalent thicknesses (row) and Pt/$Ni_{80}Fe_{20}$ planar equivalent thickness ratios (column).

| | NA | 5 Å | 10 Å | 20 Å | 50 Å |
|---|---|---|---|---|---|
| 0.2 | | 2(6) | | 2(11) | 2(5) |
| 0.6 | | 130(13) | 182(12) | 136(9) | 145(8) |
| 1 | | 133(3) | 129(7) | | 134(4) |
| 2 | | 132(2) | | | 141(10) |
| 3 | | | | 121(1) | |
| inf. | 105(14C) | | | | |

TABLE 2

Pt/Ni
Air metric current density (mA/$cm^2$) at 0.7 volts and Example number (in parentheses) for given as-deposited bilayer equivalent thicknesses (row) and Pt/Ni planar equivalent thickness ratios (column).

| | NA | 5 Å | 10 Å | 20 Å | 50 Å |
|---|---|---|---|---|---|
| 0.2 | | 3(33) | 1(32) | | |
| 0.6 | | 339(28) | 455(26) | 443(27) | |
| | | 45(30) | | | |
| 1 | | 284(25) | 496(20) | 383(19) | 537(23) |
| | | | 506(24) | | |
| 2 | | | | 497(29) | |
| | | | | 47(31) | |
| 3 | | 465(21) | 288(15) | 392(16) | 238(17) |
| | | 54(22) | 323(18) | | |
| inf. | 387(34C) | | | | |

TABLE 3

Pt/Co
$O_2$ metric current density (mA/$cm^2$) at 0.85 volts and Example number (in parentheses) for given as-deposited bilayer equivalent thicknesses (row) and Pt/Co planar equivalent thickness ratios (column).

| | NA | 5 Å | 10 Å | 20 Å | 50 Å |
|---|---|---|---|---|---|
| 0.2 | | | 2(51) | 2(50) | 2(52) |
| 0.6 | | 20(48) | 76(45) | | 109(49) |
| 1 | | 43(46) | 95(47) | | 63(43) |
| 2 | | 93(44) | 84(39) | 73(40) | 94(41) |
| | | | | 94(42) | |
| 3 | | 32(36) | 43(35) | | 48(38) |
| | | | 45(37) | | |
| inf. | 51(53C) | | | | |

TABLE 4

Pt/Mn
$O_2$ metric current density (mA/$cm^2$) at 0.85 volts and Example number (in parentheses) for given as-deposited bilayer equivalent thicknesses (row) and Pt/Mn planar equivalent thickness ratios (column).

| | NA | 5 Å | 10 Å | 20 Å | 50 Å |
|---|---|---|---|---|---|
| 0.2 | | | | | |
| 0.6 | | | 102(64) | 88(59) | |
| 1 | | 79(62) | 133(57) | 108(65) | 45(58) |
| 2 | | | 130(63) | 108(55) | 98(61) |
| | | | 107(66) | | 81(67) |
| 3 | | 62(56) | 79(60) | 93(54) | 100(68) |
| inf. | 51(69C) | | | | |

TABLE 5

Pt/$Co_{80}Fe_{20}$
$O_2$ metric current density (mA/$cm^2$) at 0.85 volts and Example number (in parentheses) for given as-deposited bilayer equivalent thicknesses (row) and Pt/$Co_{80}Fe_{20}$ planar equivalent thickness ratios (column).

| | NA | 5 Å | 10 Å | 20 Å | 30 Å | 50 Å |
|---|---|---|---|---|---|---|
| 0.2 | | | | | | |
| 0.6 | | | 159(77) | | 177(82) | 195(83) |
| 1 | | | | | | |
| 1.5 | | 141(76) | 162(78) | | 153(81) | 167(85) |
| 2 | | | | | | 145(84) |
| 3 | | | 108(79) | | 111(80) | 152(86) |
| inf. | 105(14C) | | | | | |

TABLE 6

$Pt/Mn_{80}Fe_{20}$
$O_2$ metric current density ($mA/cm^2$) at 0.85 volts and Example number (in parentheses) for given as-deposited bilayer equivalent thicknesses (row) and $Pt/Mn_{80}Fe_{20}$ planar equivalent thickness ratios (column).

| | NA | 5 Å | 10 Å | 20 Å | 30 Å | 50 Å |
|---|---|---|---|---|---|---|
| 0.2 | | | | | | |
| 0.6 | | | | | | |
| 1 | | | 91(87) | | | |
| 1.5 | | | | 107(91) | 118(92) | 147(94) |
| 2 | | | 113(88) | | | |
| 3 | | 121(89) | 133(90) | | 102(93) | 104(95) |
| inf. | 105(14C) | | | | | |

TABLE 7

$Pt/Ni_{90}Fe_{10}$
$O_2$ metric current density ($mA/cm^2$) at 0.85 volts and Example number (in parentheses) for given as-deposited bilayer equivalent thicknesses (row) and $Pt/Ni_{90}Fe_{10}$ planar equivalent thickness ratios (column).

| | NA | 5 Å | 10 Å | 20 Å | 30 Å | 50 Å |
|---|---|---|---|---|---|---|
| 0.2 | | | | | | |
| 0.6 | | 203(99) | 200(98) | | 169(102) | |
| 1 | | | | 211(104) | | 144(97) |
| 1.5 | | | 186(103) | | | 160(106) |
| 2 | | | | 182(105) | | |
| 3 | | 160(96) | 196(100) | | 128(101) | |
| inf. | 105(14C) | | | | | |

TABLE 8

$Pt/Ni_{95}Fe_5$
$O_2$ metric current density ($mA/cm^2$) at 0.85 volts and Example number (in parentheses) for given as-deposited bilayer equivalent thicknesses (row) and $Pt/Ni_{95}Fe_5$ planar equivalent thickness ratios (column).

| | NA | 5 Å | 10 Å | 20 Å | 30 Å | 50 Å |
|---|---|---|---|---|---|---|
| 0.2 | | | | | | |
| 0.6 | | | 203(112) | 159(110) | 179(115) | 200(111) |
| 1 | | 196(107) | 198(109) | | 203(116) | 132(108) |
| 1.5 | | | | | | |
| 2 | | | | | | |
| 3 | | | | 170(113) | 153(114) | 203(117) |
| inf. | 105 (14C) | | | | | |

Various modifications and alterations of this invention will become apparent to those skilled in the art without departing from the scope and principles of this invention, and it should be understood that this invention is not to be unduly limited to the illustrative embodiments set forth hereinabove.

We claim:

1. A fuel cell cathode catalyst comprising nanostructured elements which comprise microstructured support whiskers bearing nanoscopic catalyst particles, said nanoscopic catalyst particles made by alternating application of first and second layers, said first layer comprising platinum and said second layer being an alloy or intimate mixture of iron and a second metal selected from the group consisting of Group VIb metals, Group VIIb metals and Group VIIIb metals other than platinum and iron, where the atomic ratio of iron to said second metal in said second layer is between 0 and 10, where the planar equivalent thickness ratio of said first layer to said second layer is between 0.3 and 5, and wherein the average bilayer planar equivalent thickness of said first and second layers is less than 100 Å.

2. The fuel cell cathode catalyst according to claim 1 wherein the planar equivalent thickness ratio of said first layer to said second layer is between 0.3 and 2.5, and wherein the average bilayer planar equivalent thickness of said first and second layers is greater than 8 Å.

3. The fuel cell cathode catalyst according to claim 1 where the atomic ratio of iron to said second metal in said second layer is between 0.01 and 10.

4. The fuel cell cathode catalyst according to claim 3 wherein said second metal is selected from the group consisting of nickel, cobalt and manganese.

5. The fuel cell cathode catalyst according to claim 3 wherein said second metal is nickel.

6. The fuel cell cathode catalyst according to claim 5 wherein the atomic ratio of iron to nickel in said second layer is between 0.01 and 0.4.

7. The fuel cell cathode catalyst according to claim 5 wherein the atomic ratio of iron to nickel in said second layer is between 0.01 and 0.15.

8. The fuel cell cathode catalyst according to claim 3 wherein said second metal is cobalt.

9. The fuel cell cathode catalyst according to claim 8 wherein the planar equivalent thickness ratio of said first layer to said second layer is between 0.3 and 2, and wherein the average bilayer planar equivalent thickness of said first and second layers is greater than 8 Å.

10. The fuel cell cathode catalyst according to claim 3 wherein said second metal is manganese.

11. The fuel cell cathode catalyst according to claim 10 wherein the planar equivalent thickness ratio of said first layer to said second layer is between 1.25 and 5.

12. The fuel cell cathode catalyst according to claim 1 wherein said second metal is selected from the group consisting of nickel, cobalt and manganese.

13. The fuel cell cathode catalyst according to claim 1 wherein said second metal is nickel.

14. The fuel cell cathode catalyst according to claim 13 wherein the planar equivalent thickness ratio of said first layer to said second layer is between 0.3 and 2.5, and wherein the average bilayer planar equivalent thickness of said first and second layers is greater than 8 Å.

15. The fuel cell cathode catalyst according to claim 1 wherein said second metal is cobalt.

16. The fuel cell cathode catalyst according to claim 15 wherein the planar equivalent thickness ratio of said first layer to said second layer is between 0.3 and 2.5, and wherein the average bilayer planar equivalent thickness of said first and second layers is greater than 8 Å.

17. The fuel cell cathode catalyst according to claim 1 wherein said second metal is manganese.

18. The fuel cell cathode catalyst according to claim 17 wherein the average bilayer planar equivalent thickness of said first and second layers is greater than 8 Å.

19. A method of making a fuel cell cathode catalyst comprising nanoscopic catalyst particles comprising the alternate steps of vacuum deposition of a first layer comprising platinum and vacuum deposition of a second layer comprising an alloy or intimate mixture of iron and a second metal selected from the group consisting of Group VIb metals, Group VIIb metals and Group VIIIb metals other than platinum and iron, where the atomic ratio of iron to said second metal in said second layer is between 0 and 10, wherein said deposited platinum and said deposited alloy or intimate mixture of two metals form a bilayer having an average bilayer planar equivalent thickness of less than 100 Å, wherein the planar equivalent thickness ratio of deposited platinum to the deposited alloy or intimate mixture of two metals is between 0.3 and 5.

20. The method according to claim 19 wherein said vacuum deposition steps are carried out substantially in the absence of oxygen.

21. The method according to claim 19 wherein said platinum and said alloy or intimate mixture of iron and a second metal are deposited on microstructured support whiskers.

22. The method according to claim 19 wherein said second metal is selected from the group consisting of nickel, cobalt and manganese.

23. The method according to claim 19 wherein said second metal is nickel.

24. A fuel cell cathode catalyst comprising nanoscopic catalyst particles made according to the method of claim 23.

25. The method according to claim 19 additionally comprising the step of removing at least a portion of said alloy or intimate mixture of two metals after said deposition steps.

* * * * *

UNITED STATES PATENT AND TRADEMARK OFFICE

CERTIFICATE OF CORRECTION

PATENT NO. : 7,419,741 B2
APPLICATION NO. : 10/674594
DATED : September 2, 2008
INVENTOR(S) : George D. Vernstrom It is certified that error appears in the above-identified patent and that said Letters Patent is hereby corrected as shown below:

Title page

Item [56], References Cited, OTHER PUBLICATIONS,
delete "Temary" and insert -- Ternary -- therefor.

Item [56], References Cited, OTHER PUBLICATIONS, page 2,
col. 1 line 14 delete "*X-RayAbsorption*" and insert
-- *X-Ray Absorption* -- therefor.
col. 2 line 17/18 delete "Rapidly Quenched, Metals," and insert
-- Rapidly Quenched Metals, -- therefor.

Column 5

Line 55, delete "$Ni_{90}Fe_{10}$,$Ni_{95}Fe_{5}$," and insert
-- $Ni_{90}Fe_{10}$, $Ni_{95}Fe_{5}$, -- therefor.

Signed and Sealed this

Twenty-eighth Day of October, 2008

JON W. DUDAS
*Director of the United States Patent and Trademark Office*